June 29, 1965  D. F. WILHELM  3,192,027
APPARATUS FOR MEASURING PLUNGER PENETRATION
IN GLASS FORMING MACHINES
Filed July 3, 1961

INVENTOR.
DONALD F. WILHELM
BY
ATTORNEYS

United States Patent Office 3,192,027
Patented June 29, 1965

3,192,027
APPARATUS FOR MEASURING PLUNGER PENETRATION IN GLASS FORMING MACHINES
Donald F. Wilhelm, Toledo, Ohio, assignor to Owens-Illinois Glass Company, a corporation of Ohio
Filed July 3, 1961, Ser. No. 121,417
2 Claims. (Cl. 65—158)

This invention relates to glass forming and particularly to glass forming wherein a plunger is utilized to press a gob of molten glass into a predetermined shape.

In the manufacture of glass, it is customary to utilize as a step in glass forming, the movement of a plunger into engagement with a gob of glass to form the gob into a predetermined shape which may be the shape of the final article or which can be subsequently blown into the shape of the final article. It has heretofore been suggested that the size of the gob and the resultant glass article be controlled by measuring the penetration of the plunger and adjusting the variables which control the gob size accordingly or, alternatively, rejecting the resultant article which may be of an insufficient or oversize as determined by the penetration of the plunger into a gob of glass.

It is an object of this invention to provide a novel apparatus for measuring the plunger penetration.

Basically, the apparatus comprises an indicating and recording device that is associated with a suitable sensing device. The sensing device has a movable element which is adapted to be contacted by a member moved by the plunger when the plunger is being moved to pressing position. The movable element is thus positioned in accordance with the final pressing position of the plunger. In accordance with the invention, means are provided for momentarily forcing the movable element into contact with the member that is associated with the plunger at the instant the plunger is in pressing position. By this arrangement, the positioning of the movable element in accordance with the final position of the plunger is insured in those cases where the plunger moves to a position of lesser penetration than in the previous pressing stroke.

Figure 1:
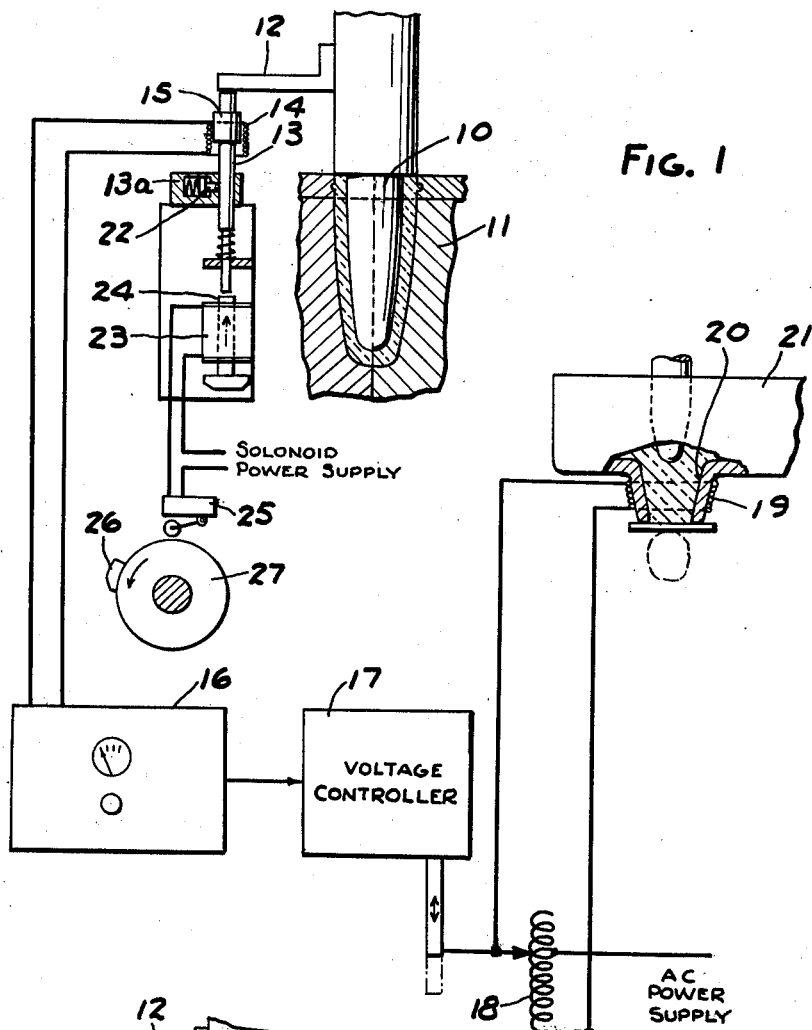
FIG. 1 is a partly diagrammatic, part sectional view of an apparatus embodying the invention.

Referring to the drawings, the apparatus is intended to be used with a conventional glass pressing machine or a press and blow machine for forming glass articles. Such machines are well known in the art and are shown, for example, in the patents to G. E. Rowe 2,508,890, issued May 23, 1950 and R. R. Denman 2,751,715, issued June 26, 1956.

For purposes of description of the present invention, the plunger 10 of such a glass machine is of the type adapted to be reciprocated, for example, by a pneumatic piston motor to and from pressing position in association with a partible blank mold 11. After a gob of glass is delivered to the mold 11, the plunger 10 is moved downwardly to press the glass. If the size of the gob of the glass is improper, the plunger will move downwardly a greater distance than if the gob of glass were of the correct size. Conversely, if a gob of glass is too great in size, the plunger 10 will only be permitted to move downwardly a lesser amount. Obviously, both conditions are undesirable since they result in variations in the size of the article that is formed.

In accordance with the invention, a laterally extending arm 12 is fixed to the plunger driving apparatus and is adapted to move with the plunger toward and away from the pressing position. A movable sensing element 13 is supported for movement generally parallel to the axis of movement of the plunger by a support 13a and is adapted to be contacted by the arm 12 on its downward movement toward the pressing position.

The element 13 is a part of a sensing device, herein shown as a transducer coil 14, the element 13 having an armature 15 thereon which cooperates with the transducer coil to produce a varying voltage depending on the position of the armature 15 with respect to the coil 14. As will be understood by a further description of the invention, other types of sensing devices may be used, provided that they are operable by a movable sensing element. Variations in the position of the element 13 are adapted to be sensed and recorded on a mechanism 16 which, in turn, can be used to create a signal, reject the article or control the variables that form the gob. As shown in FIG. 1, the recorder 16 controls a voltage controller 17 which, in turn, varies the tap on a transformer 18 which supplies a heating coil 19 around the orifice 20 of a conventional forehearth 21.

Figure 2:
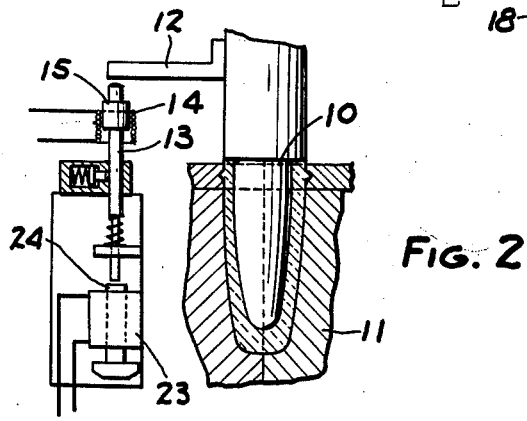
FIG. 2 is a view of a portion of the apparatus shown in FIG. 1 showing the parts in a different operative position.

The sensing element 13 is held by a spring loaded friction brake 22 in any position to which it is moved. In order to insure that the sensing element 13 will record the position of the plunger 10 in the case where the plunger 10 encounters a heavier gob on a subsequent pressing stroke and therefore penetrates or moves into the mold 11 to a lesser extent, a solenoid 23 is provided and includes an armature 24 which is actuated upon energization of the solenoid to engage the lower end of the element 13 and urge it upwardly into engagament with the arm 12. The energization of the solenoid 23 is controlled by a microswitch 25 which is actuated by cam 26 on the timing drum 27 of the glass forming machine. The arrangement is such that the solenoid 23 is actuated when the plunger 10 is moved downwardly to pressing position. In this manner, the sensing element 13 is always sensing the penetrated or pressing position of the plunger 10. For example, as shown in FIG. 2, if the plunger moves to a position of lesser penetration than in the previous pressing stroke, then the momentary energization of solenoid 23 forces element 13 upwardly into engagement with arm 12. As a result, the sensing element 13 indicates the new pressing position of plunger 10.

It can thus be seen that there has been provided a novel mechanism for indicating the successive position of a reciprocating member at one end of its movement and particularly the successive positions of a glass pressing plunger upon successive pressing of gobs of glass.

I claim:

1. In the manufacture of glass articles by pressing a plunger into a gob of plastic material, the combination comprising a plunger movable successively into and out of a mold to press gobs of plastic material, a member, means for operatively connecting said member to said plunger for movement with the plunger toward and away from pressing position, a movable element, means for mounting said element adjacent to said member in position to be engaged by said member during its movement toward pressing position and forming a part of an electrical position sensing device, means for mounting said element so that when the plunger is moved away from pressing position the element is retained in the position to which it is moved by engagement with the member when the plunger is being moved to pressing position, and means operatively connected to and operated in synchronism with said plunger to apply a force to said element in a direction opposite to the direction of movement of said plunger into a mold to urge said element into contact with said member when the plunger is in pressing position in the event that the plunger does not move into the mold in one pressing movement as far as it is moved into the mold in the prior pressing position.

2. In the manufacture of glass articles by pressing a plunger into a gob of plastic material, the combination comprising a plunger movable successively into and out of a mold to press gobs of plastic material, a member fixed to said plunger and adapted to move with said plunger toward and away from pressing position, an element forming a part of an electrical position sensing device, means for supporting said element for axial movement adjacent said member in position to be engaged by said member when the plunger is moved toward pressing position and to be moved with said plunger friction means tending to hold said element in a position corresponding to the pressing position of the plunger as the plunger is retracted from pressing position, solenoid means positioned adjacent said axially movable element and means operated in synchronism with movement of said plunger for energizing said solenoid means to apply a force to said axially movable element in a direction opposite to the direction of movement of said plunger into said mold to urge said axially movable element into engagement with said member when the plunger is in pressing position.

References Cited by the Examiner

UNITED STATES PATENTS

| | | | |
|---|---|---|---|
| 2,313,989 | 3/43 | Caldwell et al. | |
| 2,508,890 | 5/50 | Rowe | 65—158 |
| 2,751,715 | 6/56 | Denman | 65—230 X |
| 3,036,381 | 5/62 | Darde | 73—141 X |
| 3,088,591 | 5/63 | Perthen et al. | 33—172 |

DONALL H. SYLVESTER, *Primary Examiner.*